(12) United States Patent
Mori et al.

(10) Patent No.: US 11,156,628 B2
(45) Date of Patent: Oct. 26, 2021

(54) AUTOMATIC ANALYZER

(71) Applicant: Hitachi High-Technologies Corporation, Tokyo (JP)

(72) Inventors: Takamichi Mori, Tokyo (JP); Tetsuji Kawahara, Tokyo (JP); Yuichi Iwase, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 279 days.

(21) Appl. No.: 16/479,957

(22) PCT Filed: Jan. 23, 2018

(86) PCT No.: PCT/JP2018/001875
§ 371 (c)(1),
(2) Date: Jul. 23, 2019

(87) PCT Pub. No.: WO2018/155042
PCT Pub. Date: Aug. 30, 2018

(65) Prior Publication Data
US 2019/0339296 A1    Nov. 7, 2019

(30) Foreign Application Priority Data
Feb. 24, 2017  (JP) .............................. JP2017-034027

(51) Int. Cl.
*G01N 35/10*  (2006.01)
(52) U.S. Cl.
CPC ..... *G01N 35/1002* (2013.01); *G01N 35/1004* (2013.01); *G01N 35/1011* (2013.01)
(58) Field of Classification Search
CPC ........... G01N 35/1004; G01N 35/1011; G01N 35/1002; B01D 19/0036
See application file for complete search history.

(56) References Cited

U.S. PATENT DOCUMENTS 3,552,212 A  *  1/1971  Ohlin ................. G01N 35/1004
                                                    73/864.22
3,719,086 A  *  3/1973  Bannister ........... G01N 35/1004
                                                    73/864.22
(Continued)

FOREIGN PATENT DOCUMENTS

JP          63-12965 A     1/1988
JP          64-70109 A     3/1989
(Continued)

OTHER PUBLICATIONS

International Search Report of PCT/JP2018/001875 dated Mar. 20, 2018.

*Primary Examiner* — Shogo Sasaki
(74) *Attorney, Agent, or Firm* — Mattingly & Malur, PC

(57) ABSTRACT

An automatic analyzer includes a cleaning mechanism performing cleaning to drying of a probe in a short time even with a wide cleaning range of the probe. The automatic analyzer includes: a cleaning tank into which a probe is insertable and which has a cleaning port provided with suction openings; a vacuum tank; a vacuum pump that causes the vacuum tank to enter a negative pressure state, compared to atmospheric pressure; a vacuum bin; a suction nozzle that connects the suction opening of the cleaning port and the vacuum bin; a vacuum nozzle that connects the vacuum tank and the vacuum bin; and a controller. The controller causes the vacuum tank which is in the negative pressure state and the cleaning port to be conducted via the vacuum bin in a period during which a cleaning solution, with which the probe is cleaned, is discharged through the cleaning port.

12 Claims, 17 Drawing Sheets

(56) References Cited

U.S. PATENT DOCUMENTS

| | | | |
|---|---|---|---|
| 5,085,833 A | | 2/1992 | Mitsuhisa |
| 5,279,794 A | * | 1/1994 | Sasao ................. G01N 35/1004 |
| | | | 134/140 |
| 6,132,405 A | | 10/2000 | Nilsson et al. |
| 9,891,241 B2 | | 2/2018 | Mori et al. |
| 2005/0074363 A1 | * | 4/2005 | Dunfee .............. G01N 35/1004 |
| | | | 422/81 |
| 2005/0279387 A1 | * | 12/2005 | Blackwell .......... G01N 35/1004 |
| | | | 134/22.1 |
| 2015/0346231 A1 | * | 12/2015 | Mori .................. G01N 35/1004 |
| | | | 422/67 |

FOREIGN PATENT DOCUMENTS

| | | |
|---|---|---|
| JP | 5-27677 U | 4/1993 |
| JP | 11-513293 A | 11/1999 |
| JP | 2005-308506 A | 4/2005 |
| WO | 2014/112591 A1 | 7/2014 |

\* cited by examiner

[Fig. 1]
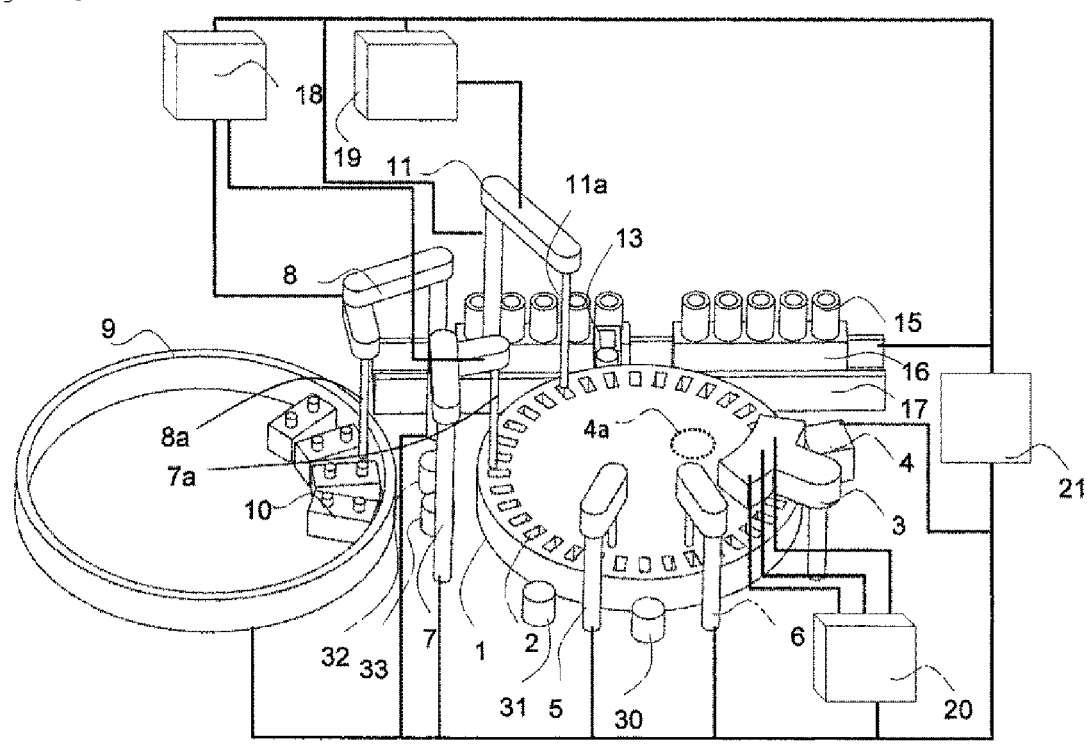

[Fig. 2A]
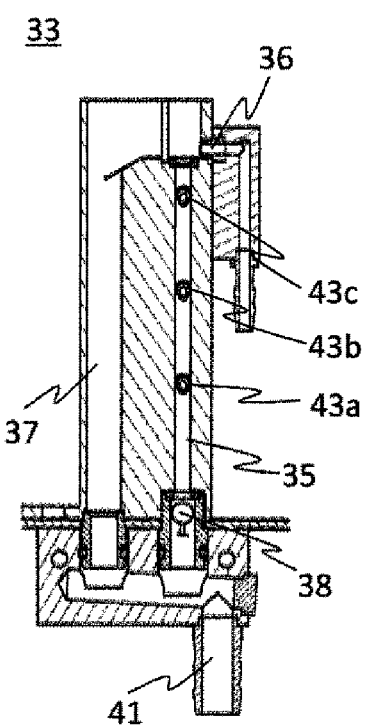

[Fig. 2B]
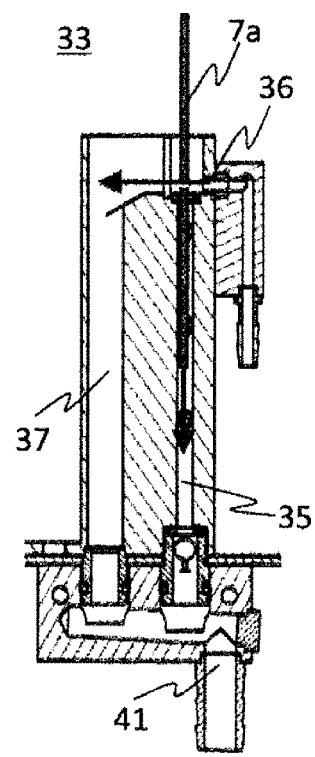

[Fig. 2C]
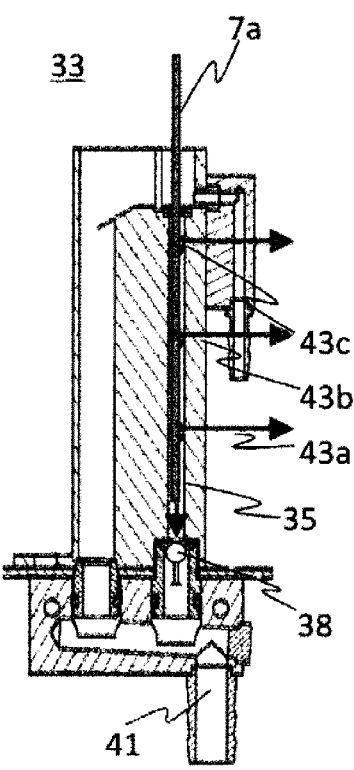

[Fig. 2D]
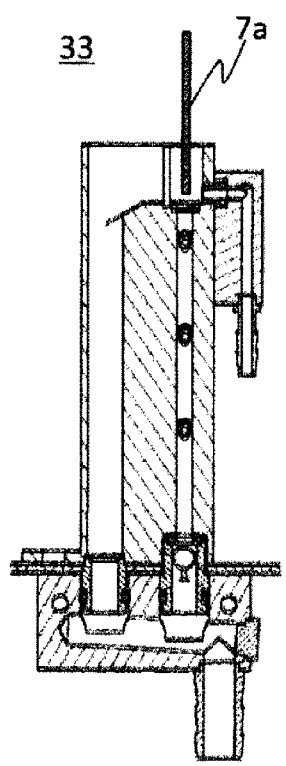
| EXTERNAL CLEANING | INTERNAL CLEANING | VACUUM SUCTION |
|---|---|---|
| OFF | OFF | OFF |

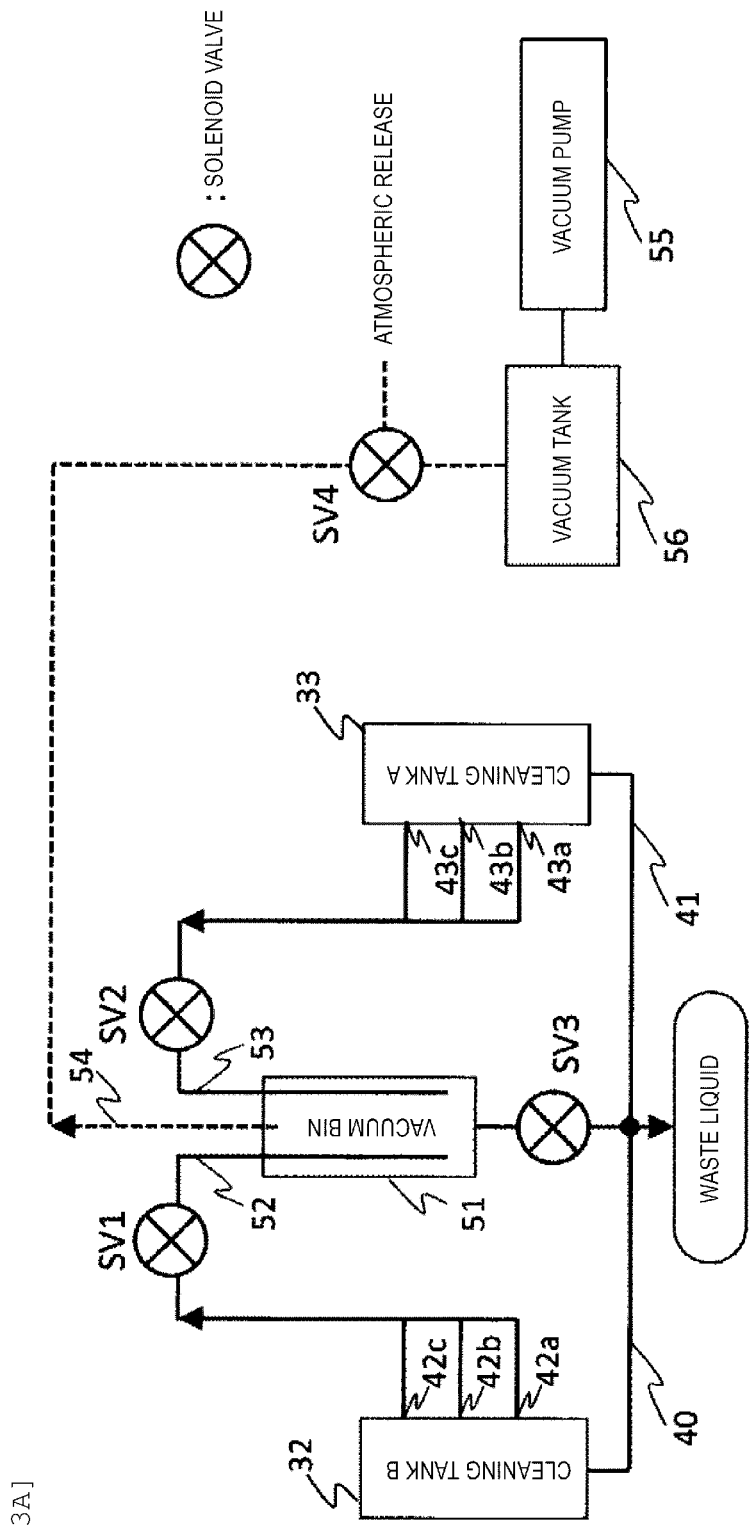
[Fig. 3A]

[Fig. 3B]

| No. | OPERATION | SV1 | SV2 | SV3 | SV4 |
|---|---|---|---|---|---|
| 1 | CLEANING TANK A33: CLEANING-SOLUTION SUCTION OPERATION | CLOSE | OPEN | CLOSE | OPEN |
| 2 | CLEANING TANK B32: CLEANING-SOLUTION SUCTION OPERATION | OPEN | CLOSE | CLOSE | OPEN |
| 3 | VACUUM BIN 51: DRAIN OPERATION | CLOSE | CLOSE | OPEN | CLOSE (ATMOSPHERIC RELEASE) |

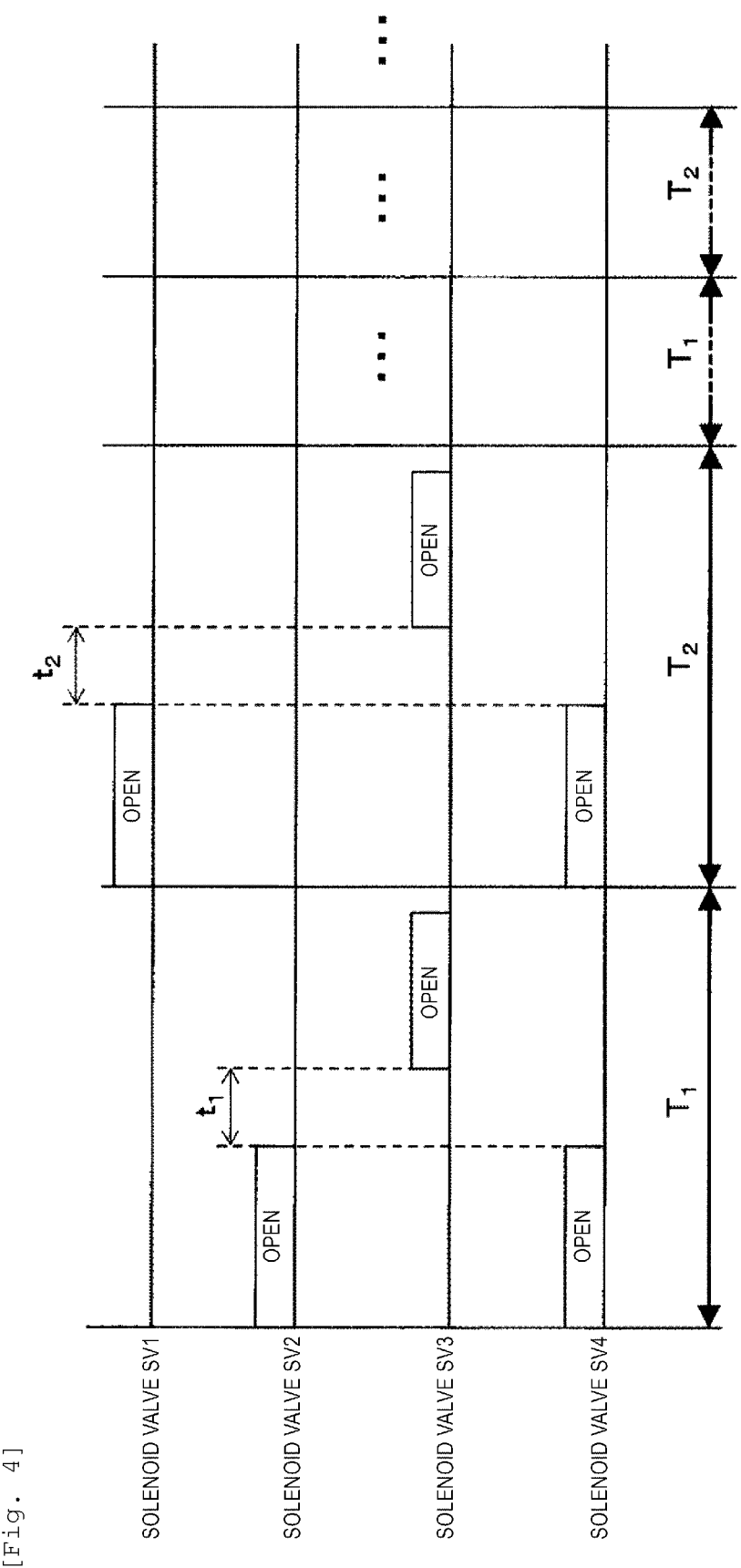

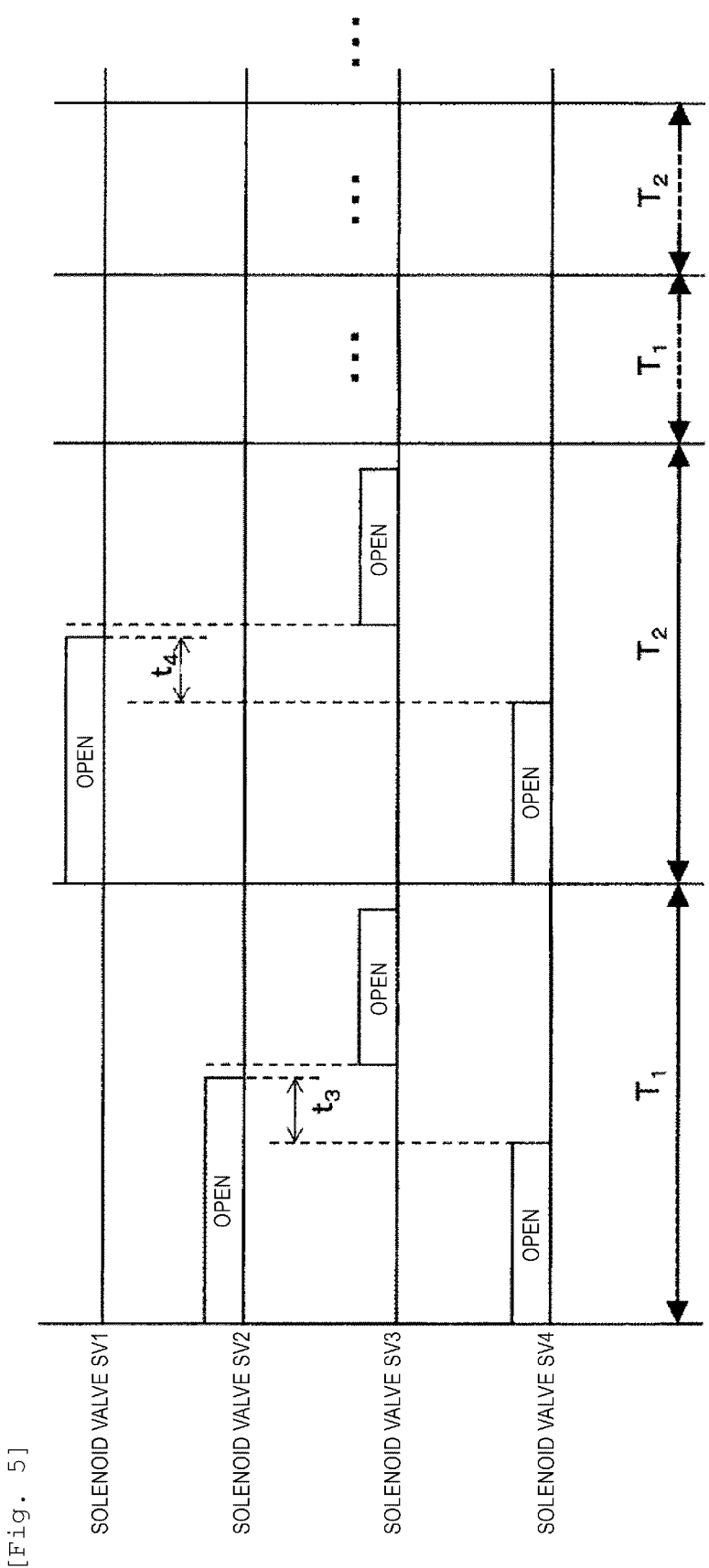
[Fig. 5]

[Fig. 6A]
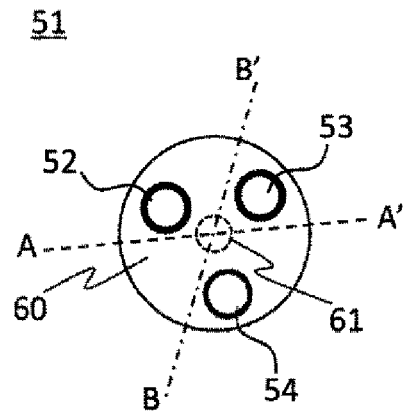
[Fig. 6B]
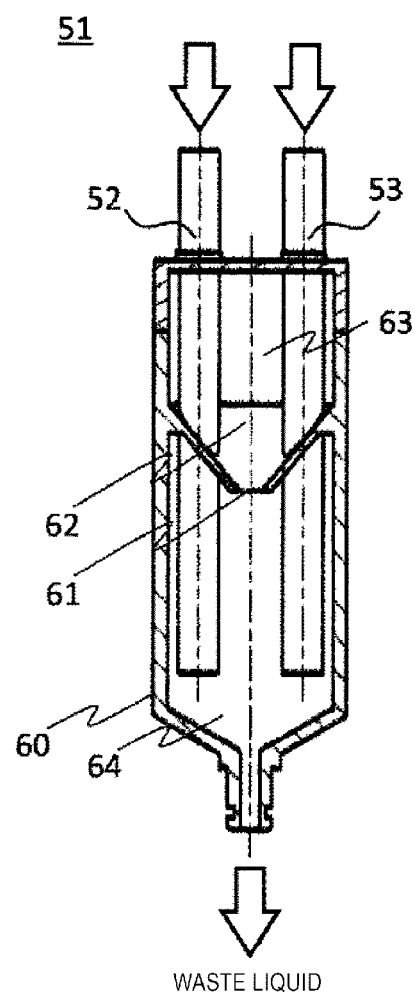

[Fig. 6C]
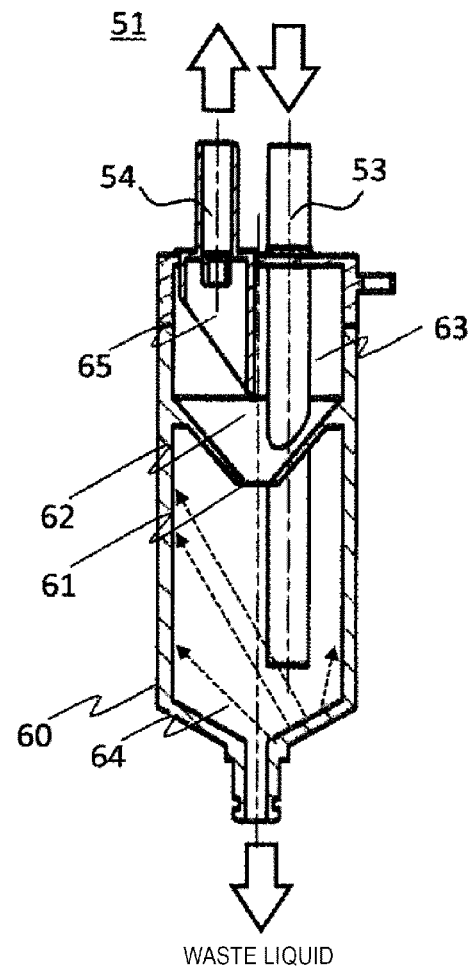
WASTE LIQUID
[Fig. 7]
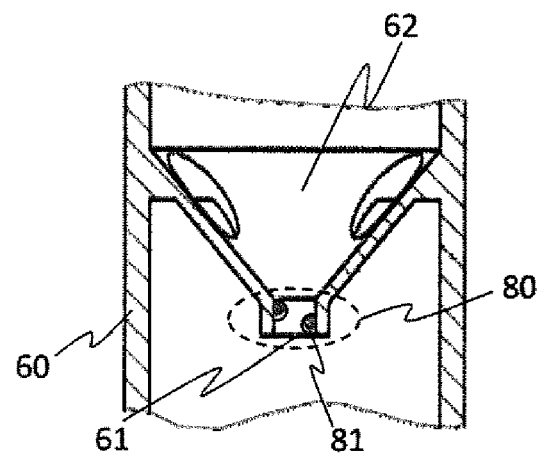

[Fig. 8A]
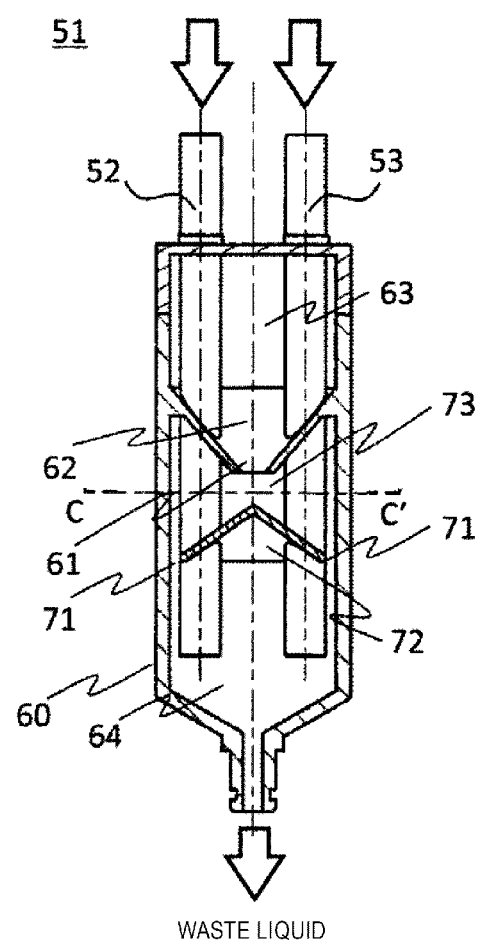

[Fig. 8B]
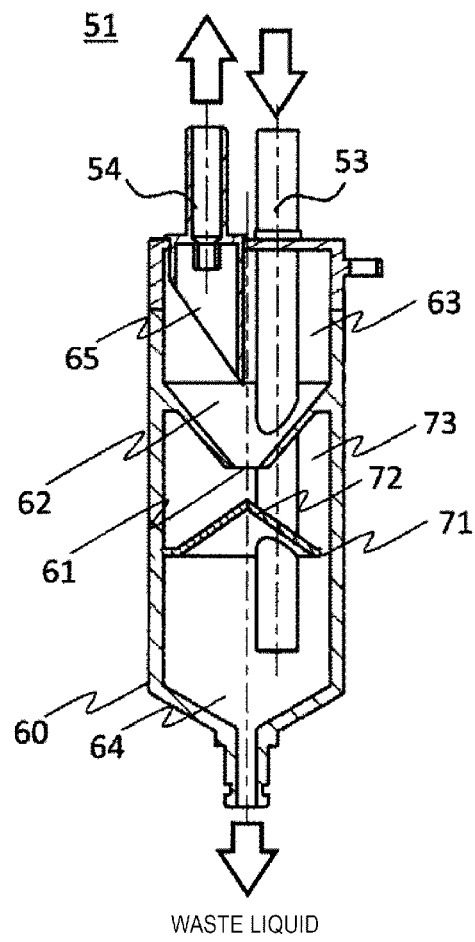
[Fig. 8C]
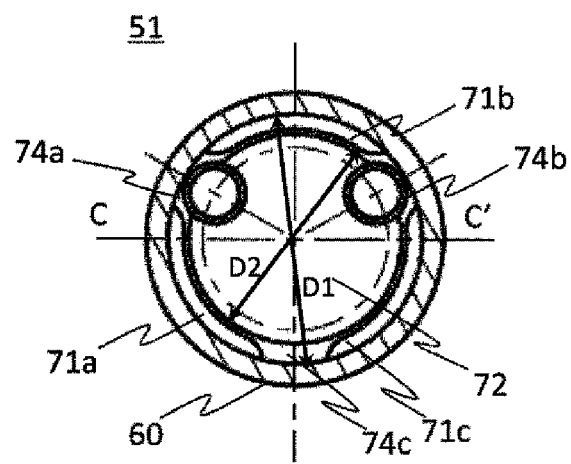

[Fig. 9]
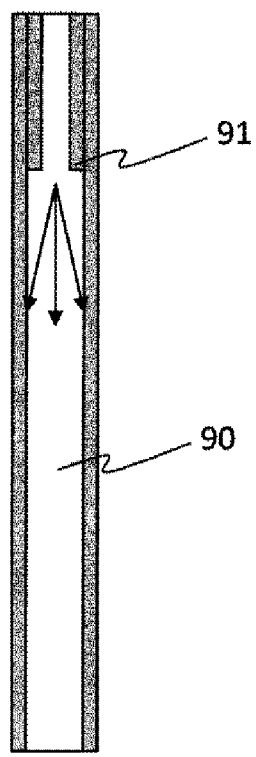

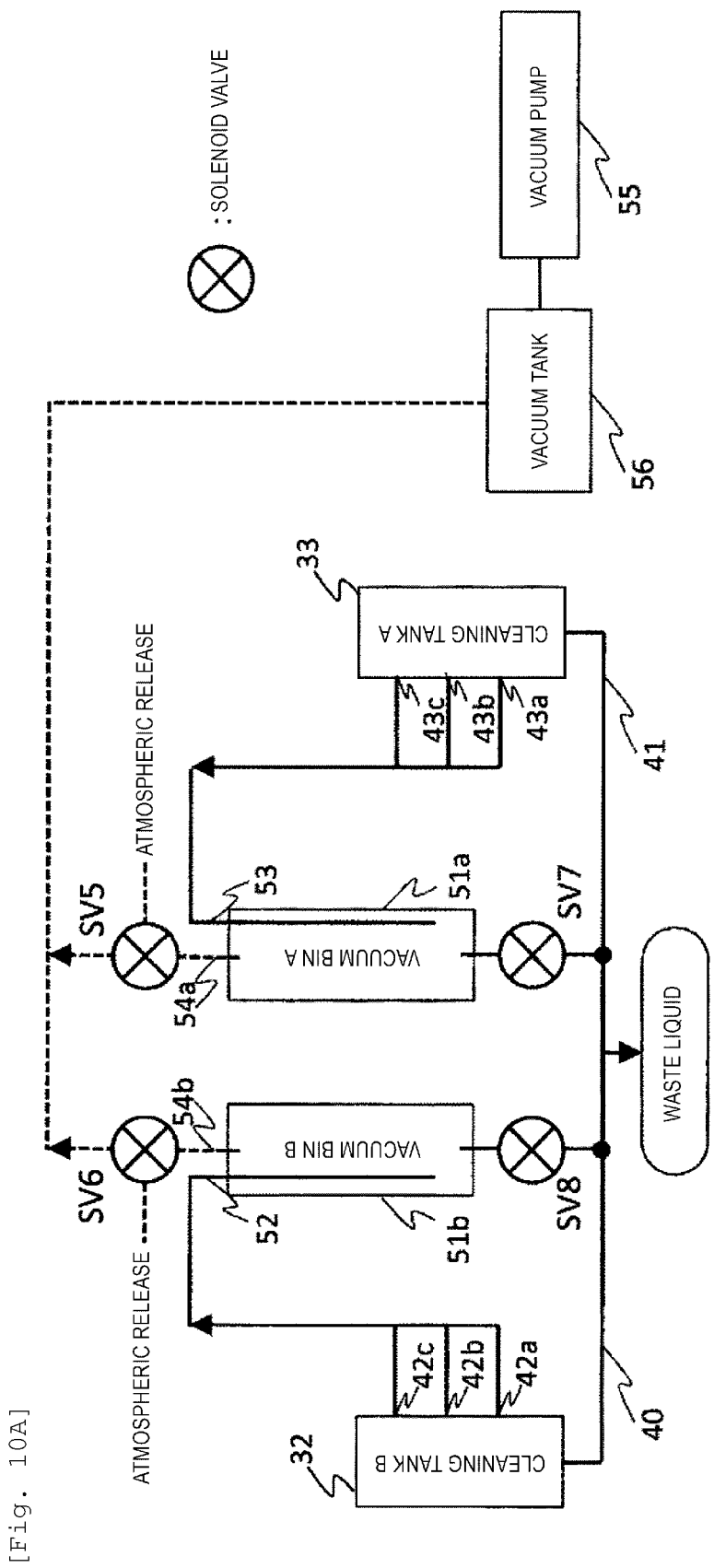
[Fig. 10A]

[Fig. 10B]

| No. | OPERATION | SV5 | SV6 | SV7 | SV8 |
|---|---|---|---|---|---|
| 1 | CLEANING TANK A33: CLEANING-SOLUTION SUCTION OPERATION | OPEN | CLOSE (ATMOSPHERIC RELEASE) | CLOSE | CLOSE |
| 2 | CLEANING TANK B32: CLEANING-SOLUTION SUCTION OPERATION | CLOSE (ATMOSPHERIC RELEASE) | OPEN | CLOSE | CLOSE |
| 3 | VACUUM BIN A51a: DRAIN OPERATION | CLOSE (ATMOSPHERIC RELEASE) | CLOSE (ATMOSPHERIC RELEASE) | OPEN | CLOSE |
| 4 | VACUUM BIN B51b: DRAIN OPERATION | CLOSE (ATMOSPHERIC RELEASE) | CLOSE (ATMOSPHERIC RELEASE) | CLOSE | OPEN |

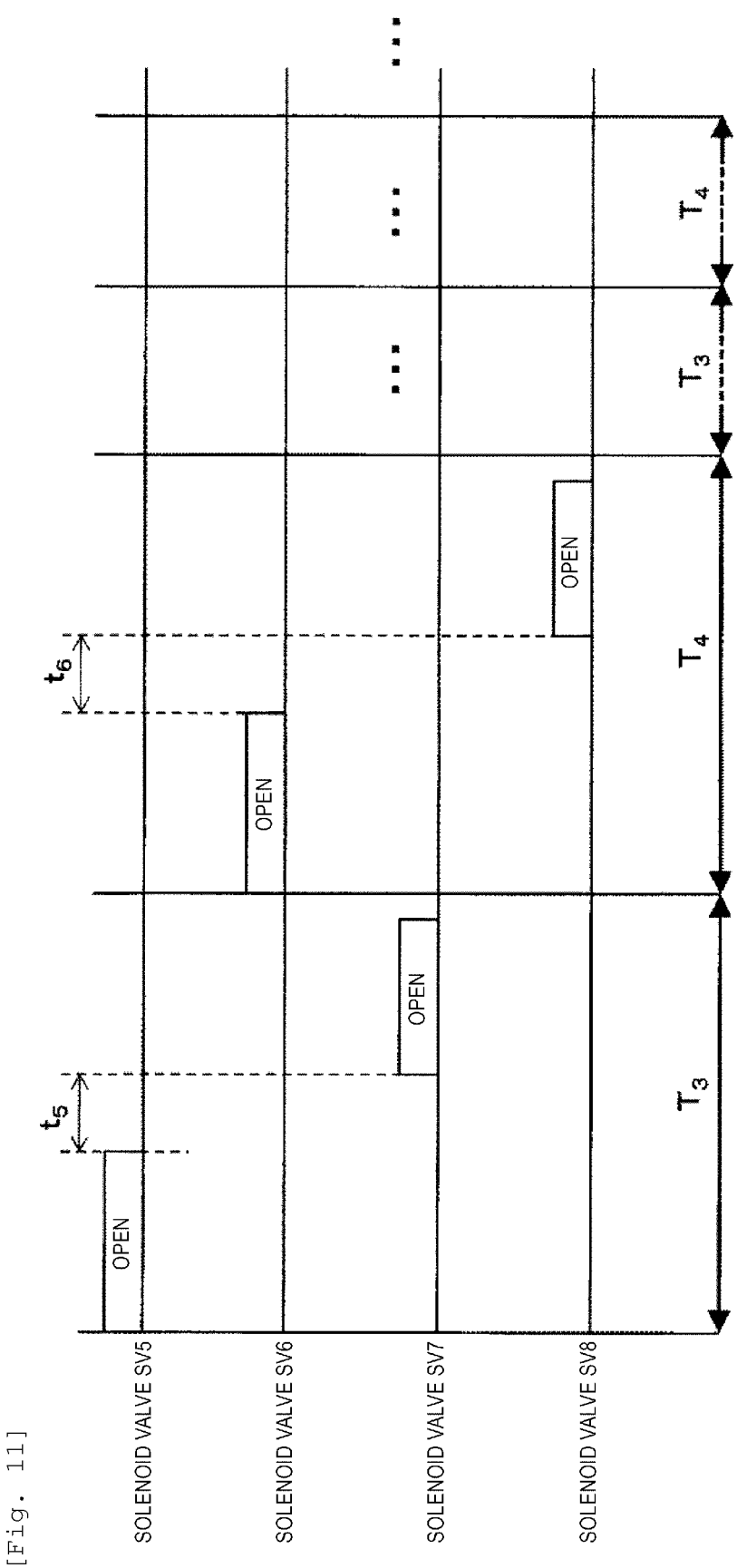
[Fig. 11]

AUTOMATIC ANALYZER

TECHNICAL FIELD

The present invention relates to an automatic analyzer that analyzes the concentration or the like of a predetermined component in a liquid sample such as blood or urine. In particular, the present invention relates to an automatic analyzer including a cleaning mechanism that discharges a probe cleaning waste liquid using a vacuum tank in a negative pressure state.

BACKGROUND ART

PTL 1 discloses a technique in which a vacuum pump is connected to a vacuum tank to maintain the inside of the vacuum tank in a negative pressure state and suction of a cleaning solution (waste liquid) discharged during cleaning of a reaction container or a probe is performed using a vacuum pressure of the vacuum tank.

PTL 1 discloses that in a reaction container cleaning mechanism in which a large amount of a cleaning solution is used, a reaction solution or a cleaning solution is temporarily stored in a suction bottle and then is discharged from the suction bottle using a solenoid valve.

CITATION LIST

Patent Literature

PTL 1: JP-A-2005-308506

SUMMARY OF INVENTION

Technical Problem

When a reagent bottle used in an automatic analyzer is used in a state where a lid of a reagent is removed, deterioration of the reagent is accelerated. On the other hand, instead of removing the lid, a small notch can be provided on the lid such that a reagent probe can dispense a reagent from the notch into a reagent bottle for use in a stable state.

When the reagent bottle is used in a state where the lid of the reagent is removed, the reagent probe includes a liquid level detection mechanism. Therefore, during the dispensing operation, a portion in contact with the reagent is a limited range of a tip. On the other hand, when the reagent bottle is used in a state where a small notch is provided on the lid of the reagent, the reagent is attached to the notch of the lid, and when the reagent probe moves up and down, the reagent attached to the notch may be attached to the reagent probe. Therefore, it is to extend the cleaning range of the reagent probe to a range from the bottom to the lid of the reagent bottle.

On the other hand, in order to improve the processing speed of an automatic analyzer, it is required to perform a process from cleaning to drying of a reagent probe in a short time.

Solution to Problem

An automatic analyzer includes: a cleaning tank into which a probe is insertable and which has a cleaning port provided with a suction opening; a vacuum tank; a vacuum pump that causes the vacuum tank to enter a negative pressure state, compared to atmospheric pressure; a vacuum bin; a suction nozzle that connects the suction opening of the cleaning port and the vacuum bin to each other; a vacuum nozzle that connects the vacuum tank and the vacuum bin to each other; and a controller, in which the controller causes the vacuum tank which is in the negative pressure state and the cleaning port to be conducted via the vacuum bin in a period during which a cleaning solution, with which the probe is cleaned, is discharged through the cleaning port.

Advantageous Effects of Invention

Provided is a highly reliable automatic analyzer capable of discharging cleaning solution waste liquid without adversely affecting a vacuum tank and capable of performing a process from cleaning to drying of a probe in a short time even when a range of cleaning of the probe is wide.

BRIEF DESCRIPTION OF DRAWINGS

FIG. 1 is a diagram illustrating an overall configuration of an automatic analyzer.

FIG. 2A is a sectional diagram of a cleaning tank.

FIG. 2B is a diagram illustrating a cleaning operation of the cleaning tank.

FIG. 2C is a diagram illustrating the cleaning operation of the cleaning tank.

FIG. 2D is a diagram illustrating the cleaning operation of the cleaning tank.

FIG. 3A is a diagram illustrating a configurational example of a flow path of the cleaning tank.

FIG. 3B is a table illustrating control of a solenoid valve for causing the cleaning tank and a vacuum bin to operate.

FIG. 4 is an example of a time chart obtained during suction of a cleaning solution from the cleaning tank.

FIG. 5 is an example of the time chart obtained during suction of the cleaning solution from the cleaning tank.

FIG. 6A is a top diagram of the vacuum bin.

FIG. 6B is a sectional diagram taken along line A-A' of the vacuum bin.

FIG. 6C is a sectional diagram taken along line B-B' of the vacuum bin.

FIG. 7 is a sectional diagram of a divider of the vacuum bin.

FIG. 8A is a sectional diagram taken along line A-A' of the vacuum bin.

FIG. 8B is a sectional diagram taken along line B-B' of the vacuum bin.

FIG. 8C is a sectional diagram taken along line C-C' of the vacuum bin.

FIG. 9 is an example in which a choke is provided in a suction nozzle.

FIG. 10A is a diagram illustrating another configurational example of the flow path of the cleaning tank.

FIG. 10B is a table illustrating control of the solenoid valve for causing the cleaning tank and the vacuum bin to operate.

FIG. 11 is an example of the time chart obtained during suction of the cleaning solution from the cleaning tank.

DESCRIPTION OF EMBODIMENTS

FIG. 1 is a perspective view illustrating an automatic analyzer according to an embodiment. The automatic analyzer dispenses samples and reagents into a plurality of reaction containers 2, respectively, causes the sample and the reagent to react with each other, and measures the reaction solution. The automatic analyzer includes a reaction disc 1, a reagent disc 9, a sample conveyance mechanism 17, reagent dispensing mechanisms 7 and 8, a reagent syringe 18, a sample dispensing mechanism 11, a sample syringe 19, a cleaning mechanism 3, a light source 4a, a spectrophotometer 4, agitation mechanisms 5 and 6, a cleaning pump 20, cleaning tanks 13, 30, 31, 32, and 33, and a controller 21.

The reaction containers 2 are arranged on a circumference of the reaction disc 1. The sample conveyance mechanism 17 that moves a rack 16 on which sample containers 15 are loaded is provided near the reaction disc 1. The sample container 15 stores a test sample (specimen) such as blood, is loaded on the rack 16, and is conveyed by the sample conveyance mechanism 17. The sample dispensing mechanism 11 capable of rotation and upward and downward movement is provided between the reaction disc 1 and the sample conveyance mechanism 17. The sample dispensing mechanism 11 includes a sample probe 11a to which a sample syringe 19 is connected. The sample probe 11a moves along an arc around a rotating shaft of the sample dispensing mechanism 11 and dispenses the sample from the sample container 15 into the reaction container 2.

A plurality of reagent bottles 10 can be loaded on a circumference of the reagent disc 9. The reagent disc 9 is kept cool, the reagent dispensing mechanism 7 and 8 capable of rotation and upward and downward movement is provided between the reaction disc 1 and the reagent disc 9. The reagent dispensing mechanisms 7 and 8 includes reagent probes 7a and 8a to which the reagent syringes 18 are connected, respectively. Each of the reagent probes 7a and 8a moves along an arc around a rotating shaft, accesses the reagent disc 9, and dispenses the reagent from the reagent bottle 10 into the reaction container 2.

In the vicinity of the reaction disc 1, the cleaning mechanism 3 that cleans the reaction container after the measurement, the agitation mechanisms 5 and 6 that agitate a liquid mixture (reaction solution) of the sample and the reagent in the reaction container, the light source 4a emits light to the liquid mixture (reaction solution) in the reaction container, for example, to measure the absorbance thereof, and the spectrophotometer 4 are arranged. In addition, the cleaning pump 20 is connected to the cleaning mechanism 3. The cleaning tanks 13, 33, 32, 31, and 30 are provided on operating ranges of the sample dispensing mechanism 11, the reagent dispensing mechanisms 7 and 8, and the agitation mechanisms 5 and 6, respectively. Each of the mechanisms of the automatic analyzer is connected to and is controlled by and is controlled by the controller 21.

The analysis process of the automatic analyzer on the test sample is generally performed in the following order. First, the sample in the sample container 15 loaded on the rack 16 that is conveyed to the vicinity of the reaction disc 1 by the sample conveyance mechanism 17 is dispensed into the reaction container 2 on the reaction disc 1 by the sample probe 11a of the sample dispensing mechanism 11. Next, the reagent used for the analysis is dispensed from the reagent bottle 10 on the reagent disc 9, into the reaction container 2 into which the sample is dispensed, by the reagent probe 7a of the reagent dispensing mechanism 7 or the reagent probe 8a of the reagent dispensing mechanism 8. Next, the liquid mixture of the sample and the reagent in the reaction container 2 is agitated by the agitation mechanism 5.

Next, light emitted from the light source 4a causes to pass through the reaction container 2 containing the liquid mixture such that the light intensity of the transmitted light is measured by the spectrophotometer 4. The light intensity measured by the spectrophotometer 4 is transmitted to the controller 21 through an A/D converter and an interface. In the controller 21, for example, the concentration or the like of a predetermined component of an analysis item corresponding to the reagent is calculated from the absorbance of the liquid mixture (reaction solution). The obtained measurement result is displayed on a display unit (not illustrated).

The reagent probe 7a used for dispensing the reagent is cleaned by a cleaning tank A33, and the reagent probe 8a is cleaned by a cleaning tank B32. However, in order to prevent the reagent in the reagent bottle 10 from being diluted, it is necessary to remove the cleaning solution used for cleaning from the reagent probe after cleaning. Therefore, a configuration in which a cleaning portion that cleans a tip of the reagent probe with the cleaning solution and a suction portion that removes the cleaning solution attached to the reagent probe by vacuum suction are provided separate from the cleaning tank to perform cleaning and cleaning solution removal, which accompanies the movement of the reagent probe. Therefore, this configuration is not suitable for a high-speed operation. On the other hand, when cleaning and cleaning solution removal are performed at one position, a high-speed operation can be performed. However, particularly when a period during which the cleaning solution for cleaning the reagent probe is discharged and a period during which the cleaning solution removal operation is performed are adjusted to overlap each other for high speed, the amount of the cleaning solution that is required to be discharged by vacuum suction increases.

In particular, it is not necessary to remove a lid of the reagent bottle 10 to secure the safety of the reagent, and in a case where a small notch is provided on the lid such that the reagent probe 7a and 8a are inserted into the notch to suck the reagent, the reagent is attached to the notch of the lid of the reagent bottle 10 when the reagent probe 7a and 8a pass through the notch. Therefore, it is necessary to set the cleaning range of the reagent probes 7a and 8a to a range corresponding to a height from the lid of the reagent bottle 10 to the container bottom of the reagent bottle 10 which is the maximum range of the reagent attached. Therefore, when the lid of the reagent bottle 10 is removed, it is necessary to clean only the tips of the reagent probes 7a and 8a. In contrast, when a notch is provided on the lid of the reagent bottle 10, the cleaning range itself becomes wide.

Therefore, in the embodiment, a vacuum bin temporarily storing the cleaning solution (waste liquid) that is vacuum-sucked from the cleaning tank is provided. As a result, the reagent probe can be cleaned at high speed while preventing a large amount of the waste liquid from flowing into the vacuum tank for vacuum-suctioning the cleaning tank.

Next, FIG. 2A is a sectional view of the cleaning tank A33. The reagent probe 7a is inserted into a cleaning port 35 such that the cleaning and the cleaning solution removal of the reagent probe 7a are performed in the cleaning port 35. An outlet 36 discharges external cleaning water (cleaning solution) that cleans the outside of the reagent probe. In addition, waste-liquid pipes 37 and 41 discharge the cleaning solution used for cleaning the reagent probe. In addition, vacuum suction openings 43a to 43c remove the cleaning solution attached to the reagent probe by vacuum-suctioning the cleaning port. The cleaning operation of the cleaning tank A33 will be described using FIGS. 2B to 2D. The cleaning tank B32 that cleans the reagent probe 8a also has the same configuration and is different from the cleaning tank A33 in a timing at which the cleaning operation is performed.

In FIG. 2B, when or immediately before the reagent probe 7a is inserted into the cleaning port 35 of the cleaning tank A33, the external cleaning water (cleaning solution) is discharged from the outlet 36. By moving down the cleaning port 35, the entire side surface of the reagent probe 7a can be cleaned. The used external cleaning water (cleaning solution) is discharged through the waste-liquid pipes 37 and 41. When or immediately after the reagent probe 7a enters the cleaning port 35, internal cleaning solution (cleaning solution) is discharged from the reagent probe 7a to clean the inside of the probe. The used internal cleaning solution (cleaning solution) is discharged through the cleaning port 35 and the waste-liquid pipe 41. In this step, vacuum suction is not performed.

In FIG. 2C, immediately before the reagent probe 7a moves up from the cleaning port 35, the discharge of the external cleaning water ends, and vacuum suction starts through the vacuum suction openings 43a to 43c in a state where the internal cleaning solution is discharging. By reducing the pressure of the cleaning port 35, a ball 38 is moved up, the cleaning port 35 and the waste-liquid pipe 41 are blocked, and the vacuum degree in the cleaning port 35 is maintained. Therefore, not only the cleaning solution (external cleaning water) attached to the outside of the reagent probe but also the cleaning solution (internal cleaning solution) from the reagent probe 7a are sucked by vacuum suction. Thus, a large amount of the cleaning solution is sucked by the vacuum suction openings 43a to 43c.

In FIG. 2D, vacuum suction is stopped when the reagent probe 7a is pulled up from the cleaning port 35. Accordingly, the ball 38 returns to the original position. The discharge of the cleaning solution (internal cleaning solution) ends while the reagent probe 7a is moving up in the cleaning port 35 before being pulled up from the cleaning port 35.

FIG. 3A is a diagram illustrating a configurational example of a cleaning mechanism of each of the cleaning tanks A33 and B32. As described above with reference to FIG. 2C, in the configuration of the cleaning tank according to the embodiment, a large amount of the cleaning solution is sucked during vacuum suction. Therefore, in the configuration of the flow path illustrated in FIG. 3A, a vacuum bin 51 that temporarily stores the sucked cleaning solution is provided. A suction nozzle A53, a suction nozzle B52, and a vacuum nozzle 54 are introduced into the vacuum bin 51, and a solenoid valve SV3 for discharging the cleaning solution stored in the vacuum bin 51 is connected to the vacuum bin 51. The vacuum suction openings 43a to 43c of the cleaning tank A33 are connected to the suction nozzle A53 through a solenoid valve SV2. Likewise, vacuum suction openings 42a to 42c of the cleaning tank A32 are connected to a suction nozzle A52 through a solenoid valve SV1. In addition, a waste-liquid pipe B40 corresponding to a waste-liquid pipe A41 provided in the cleaning tank A33 is also provided in the cleaning tank B and discharges external cleaning water or the like. The vacuum nozzle 54 is connected to the vacuum tank 56 through a solenoid valve SV4. When the solenoid valve SV4 is closed, the pressure in the vacuum tank 56 is maintained in a negative pressure state by the vacuum pump 55 compared to atmospheric pressure. Except for the installation positions of the solenoid valves, paths of the vacuum suction opening and the suction nozzles and paths of the vacuum nozzle and the vacuum tank are connected through flexible tubes.

Here, in the configuration of the flow path of FIG. 3A, the control of the solenoid valves SV1 to SV4 for operating the cleaning tank and the vacuum bin is illustrated in FIG. 3B. In FIG. 3B, the suction operations of the cleaning tank A33 and the cleaning tank B32 are alternately performed. As a result, by simultaneously performing the suction operations of the two cleaning tanks, a rapid decrease in the vacuum degree of the vacuum tank 56 can be prevented. That is, in a case (No. 1) where the cleaning-solution suction operation of the cleaning tank A33 is performed, the solenoid valve SV3 is closed and the solenoid valve SV4 is opened such that the vacuum bin 51 enters a negative pressure state, and the solenoid valve SV2 is opened such that the cleaning solution from the cleaning tank A33 is sucked. A case (No. 2) where the cleaning-solution suction operation of the cleaning tank B32 is performed is also the same. In a case (No. 3) where the cleaning solution stored in the vacuum bin 51 is discharged, the solenoid valves SV1 and SV2 are closed and the solenoid valve SV4 is closed (atmospheric release) such that the vacuum bin 51 enters a normal pressure state, and the solenoid valve SV3 is opened.

The amount of the cleaning solution sucked from the cleaning port of the cleaning tank to the vacuum bin is large. Therefore, it is necessary to discharge the cleaning solution after temporarily storing the cleaning solution. A large amount of the cleaning solution is sucked every cycle. Therefore, unless the cleaning solution in the vacuum bin is optimized, the cleaning solution in the vacuum bin flows into the flow path of the vacuum tank, the cleaning solution accumulates in the vacuum tank, and the vacuum performance deteriorates. On the other hand, since the vacuum bin is arranged in the automatic analyzer, it is desirable that the size of the vacuum bin is as small as possible.

FIG. 4 is a time chart illustrating the operation of the solenoid valve illustrated in FIG. 3B on the time axis. In this example, suction and discharge of the cleaning solution from and to the vacuum bin are performed every cycle. As described above, a period T1 during which the cleaning tank A33 is operated to suck the cleaning solution attached to the reagent probe 7a and a period T2 during which the cleaning tank B32 is operated to suck the cleaning solution attached to the reagent probe 8a are repeated. In each of the periods, a wait time t1 (wait time t2) for stabilizing the pressure in the vacuum bin is provided until the solenoid valve SV3 is opened after closing the solenoid valve SV2 (solenoid valve SV1). The wait time t1 may be the same as the wait time t2. The reason for providing the wait time is as follows. Immediately after the solenoid valve SV2 (SV1) is closed, the vacuum bin is in a state where the sucked cleaning solution and air are mixed. When the solenoid valve SV3 is closed in this state, the cleaning solution stored in the vacuum bin is scattered up to the upper region of the vacuum bin due to a rapid pressure variation generated from the bottom of the vacuum bin, the cleaning solution is attached to the vacuum nozzle, and the cleaning solution may be finally drawn to the vacuum tank. Therefore, the wait time is provided such that the cleaning solution in the vacuum bin is stabilized. In a case where the cleaning solution is stabilized, when the solenoid valve V3 is opened, the cleaning solution in the vacuum bin can be suppressed from being scattered.

FIG. 5 is another example of the time chart capable of stabilizing the inside of the vacuum bin after the suction operation. In the example of FIG. 5, the solenoid valve SV2 (SV1) is maintained to be open only for a delay time t3 (delay time t4) after closing the solenoid valve SV4. As a result, immediately before opening the solenoid valve SV3, the solenoid valve SV2 (SV1) is closed. By opening the solenoid valve SV2 (SV1) in a state where the solenoid valve SV4 is closed, the inside of the vacuum bin approaches a normal pressure state from a negative pressure state through the cleaning tank A33 (cleaning tank B32).

Therefore, the inside of the vacuum bin can return to a stable state close to atmospheric pressure immediately before opening the solenoid valve SV3, and the cleaning solution can be more stably discharged. The control of these solenoid valves is also performed by the controller 21.

Here, in order to remove the cleaning solution attached to the reagent probe in a short time, it is necessary to increase the air flow taken into the vacuum bin. The cleaning solution sucked from the cleaning tank vigorously collides with the side surface or the bottom surface of the vacuum bin such that the cleaning solution is attached to the inside of the vacuum bin. As the air flow increases, the cleaning solution is more largely scattered in the vacuum bin such that the cleaning solution is attached to the entire area of the vacuum bin. On the other hand, it is necessary to suppress the cleaning solution sucked into the vacuum bin from being taken from the vacuum bin into the flow path to the vacuum tank. The reagent probe is cleaned every cycle. Therefore, when the suction amount of the cleaning solution from the vacuum bin into the flow path of the vacuum tank is large, the cleaning solution accumulates in the vacuum tank, the performance of the vacuum tank deteriorates, and thus the ability to remove the cleaning solution deteriorates. For example, even when the cleaning solution in the vacuum bin is scattered, the flowing of the cleaning solution into the vacuum tank can be suppressed by increasing the size of the vacuum bin in a longitudinal direction, but it is not desirable to increase the size of the vacuum bin.

A structure of the compact vacuum bin that does not deteriorate the suction capacity will be described using FIGS. 6A to 6C. FIG. 6A is a top diagram of the vacuum bin. FIG. 6B is a sectional diagram taken along line A-A' (dotted line) of the vacuum bin. FIG. 6C is a sectional diagram taken along line B-B' (chain line) of the vacuum bin. For convenience of description, a side to which nozzles 52 to 54 are connected will be referred to as "upper side", and a side to which the waste-liquid pipe is connected will be referred to as "lower side". A vacuum bin main body 60 is not particularly limited and is made of a resin, and it is desirable that at least a part thereof is made of a transparent resin. Since at least a part of the vacuum bin main body is made of a transparent resin, the state of the vacuum bin is easily checked when an abnormality occurs in vacuum suction.

The inside of the vacuum bin main body 60 is separated into an upper space 63 and a lower space 64 by a divider 62. In addition, the divider 62 has a downwardly tapered portion, and an air inlet 61 is provided at the center thereof. The suction nozzle A53 and the suction nozzle B52 pass through the divider 62, and tips of the nozzles are arranged in the lower space 64. A vacuum nozzle cover 65 is provided at a tip of the vacuum nozzle 54, which is arranged in the upper space 63.

The vacuum bin is vacuum-sucked through the air inlet 61 and the vacuum nozzle 54, and the cleaning solutions of the cleaning tank A33 and the cleaning tank B32 are sucked from the suction nozzle A53 and the suction nozzle B52. The sucked cleaning solution is discharged to the lower space 64. The sucked cleaning solution in the lower space 64 collides with the vacuum bin bottom surface to be scattered (FIG. 6C: an arrow of a dotted line). The flow-around of the cleaning solution can be prevented in the upper space 63 by the divider 62. As a result, the flowing of the cleaning solution to the vacuum tank can be prevented. In addition, by forming the divider 62 in a downwardly tapered shape, the cleaning solution attached to the lower surface of the divider 62 can be caused to fall off. In addition, even when the cleaning solution flows into the upper space 63, the cleaning solution is discharged through the tapered portion of the divider 62 and the air inlet 61.

Further, in the structure of FIG. 6C, by shifting a central axis of the vacuum nozzle 54 and a central axis of the air inlet 61 of the divider 62 in a longitudinal direction of the vacuum bin main body from each other, the flowing of the cleaning solution into the vacuum tank can be prevented. The reason for this is as follows. When the central axis of the vacuum nozzle 54 and the central axis of the divider 62 (air inlet 61) are aligned, a vacuum suction route to the vacuum nozzle leads straight to the lower space 64. As a result, the cleaning solution that collides with the vacuum bin to be scattered in the lower space 64 as liquid particles is sucked by the vacuum nozzle.

Further, the vacuum nozzle 54 is provided with a vacuum nozzle cover 65. The vacuum nozzle cover 65 is provided in order to prevent the outer diameter of the vacuum nozzle cover from entering the central axis of the air inlet 61. Further, when the vacuum nozzle cover is arranged such that the outer diameter thereof does not overlap the straight line of the outer diameter of the air inlet 61, the flowing of the cleaning solution into the vacuum nozzle 54 can be prevented. In the example of FIG. 6C, the vacuum nozzle cover 65 has a shape obtained by obliquely cutting a tip of a cylindrical cover. The reason for this is that, when an angle is provided in the vacuum nozzle cover, the anti-dripping properties can be improved. The air inlet 61 functions as an inlet of the cleaning solution to the upper space 63. Therefore, the vacuum nozzle cover 65 is provided so as not to interfere the air flow to the air inlet 61 and an end portion of the vacuum nozzle 54.

FIG. 6C is merely exemplary, and various modifications can be made. For example, in the example of FIG. 6C, the divider 62 has a downwardly tapered shape but may also have a planar shape. In this case, since the divider has a planar shape, liquid droplets (cleaning solution) attached to the lower surface of the divider are not likely to fall off, compared to the examples of FIGS. 6A to 6C. As a countermeasure, by forming a water-repellant coating film on the lower surface of the divider, liquid droplets (cleaning solution) can be made to easily fall off. In addition, by forming a hydrophilic coating film on the upper surface of the divider such that the cleaning solution flowing into the upper space 63 does not remain on the upper surface of the divider, the cleaning solution may be made to spread thin on the upper surface of the divider such that the flowing of the cleaning solution into the vacuum nozzle 54 can be suppressed.

On the other hand, even in a case where the divider 62 has a downwardly tapered shape as a whole, for example, when a downward extension portion 80 is present in the air inlet 61 as illustrated in FIG. 7, liquid droplets 81 of the cleaning solution are likely to be attached to an inner surface of the extension portion 80, the attached cleaning solution is sucked by the vacuum nozzle so as to move to the upper space 63. In order to reduce this phenomenon, as illustrated in FIGS. 6B and 6C, it is desirable that the gradient of the tapered shape around the air inlet 61 of the divider 62 does not change or the air inlet 61 (when the divider 62 has a tapered shape, the most tapered portion thereof) is as thin as possible.

An example of FIGS. 8A to 8C shows a configuration in which, even when the suction force is further strengthened or a larger amount of the cleaning solution is sucked compared to the example of FIGS. 6A to 6C, the ability to prevent the cleaning solution from entering the vacuum nozzle is improved. The top view is the same as FIG. 6A. FIG. 8A is a sectional diagram taken along line A-A' (dotted line) of FIG. 6C. FIG. 8B is a sectional diagram taken along line B-B' (chain line) of FIG. 6C. In addition, FIG. 8C is a sectional diagram taken along line C-C' of the vacuum bin when seen from the top. In this example, the vacuum bin includes an upper divider 62 (represented by the same reference numeral because the structure is the same) corresponding to the divider 62 of FIGS. 6A to 6C and a lower divider 72. A space in the vacuum bin is divided into three spaces including the upper space 63, the lower space 64, and an intermediate space 73. In addition, the upper divider 62 has a downwardly tapered shape in which the air inlet 61 is formed in the most tapered portion, and the lower divider 72 has an upwardly tapered shape in which slit-shaped air inlets 71a to 71c are formed in the peripheral portion. The suction nozzle A53 and the suction nozzle B52 pass through the upper divider 62 and the lower divider 72, and tips of the nozzles are arranged in the lower space 64. The vacuum nozzle cover 65 is provided at a tip of the vacuum nozzle 54, which is arranged in the upper space 63.

The vacuum bin is vacuum-sucked through the air inlets 71a to 71c, the air inlet 61, and the vacuum nozzle 54, and the cleaning solutions of the cleaning tank A33 and the cleaning tank B32 are sucked from the suction nozzle A53 and the suction nozzle B52. The sucked cleaning solution is discharged to the lower space 64. The sucked cleaning solution in the lower space 64 collides with the vacuum bin bottom surface to be scattered. In this example, by drawing a vacuum from the air inlet 71 provided in the peripheral portion of the lower divider 72 through the air inlet 61 provided at the center of the upper divider 62, the length of a path of liquid droplets scattered on the vacuum bin bottom surface to the vacuum nozzle 54 is increased. In addition, by trapping the cleaning solution in the vacuum bin, the amount of the cleaning solution taken into the vacuum tank through the vacuum nozzle 54 is suppressed.

Actually, when the amount of the cleaning solution discharged from the suction nozzle A53 and the suction nozzle B52 is large and the force thereof is high, the cleaning solution collides with the vacuum bin bottom surface and moves up along the side surface of the lower space 64. Even when the cleaning solution moves up to the intermediate space 73 through the air inlet 71, the cleaning solution falls off to the lower space 64 because the lower divider 72 has an upwardly tapered shape. Further, even when the cleaning solution penetrates up to the upper space 63 over the air inlet 61 of the upper divider 62, the cleaning solution falls off to the intermediate space 73 using the downwardly tapered shape of the upper divider 62, and the cleaning solution can be effectively discharged up to the lower space 64 using a slope of the lower divider 72.

The vacuum suction amount for the same time is determined depending on the diameter of an opening portion, and the suction capacity of the cleaning mechanism is defined by the opening area of the vacuum nozzle.

Therefore, the opening area of the air inlet 61 the opening area of the vacuum nozzle 54.

Further, when a plurality of dividers are provided in the vacuum bin, the amount of air in the vacuum bin suctioned by the vacuum nozzle is not interfered.

Therefore, the opening area of the air inlet 71 the opening area of the air inlet 61 (when a plurality of air inlets 71 are present as illustrated in FIG. 8C, the sum of the opening areas).

In addition, a relationship (D1−D2)/2 between an inner diameter D1 of the vacuum bin main body 60 and a diameter D2 of the lower divider 72 is an open width of the slit of the air inlet 71. Therefore, when the cleaning solution discharged from the suction nozzle is moved up to the air inlet 71, it is necessary that the difference is adjusted such that the cleaning solution does not remain in the air inlet 71 due to the surface tension thereof.

For example, when D1=ϕ60 mm and D2=ϕ58 mm, the open width of the air inlet 71 is 1.0 mm, and the cleaning solution is likely to remain in the air inlet 71. In this state, the cleaning solution in this state may be sucked from the vacuum nozzle to a vacuum so as to easily penetrate to the intermediate space 73 and the upper space 63. Therefore, it is necessary to set the air inlet 71 at a minimum interval such that the cleaning solution does not remain. This setting is determined depending on the surface tension that varies depending on the diameter of the vacuum bin and the thickness and material of the lower divider 72.

In addition, in FIG. 8C, the lower divider 72 is held in the vacuum bin main body 60 by divider holders 74a to 74c, and the air inlets 71a to 71c divided by the divider holders 74a to 74c are formed. Of course, as long as the rigidity is secured, the number of the divider holders 74 may be reduced, or the number of the divider holders 74 each of which is thin may be increased such that the number of the air inlets 71 can be increased. In addition, the number of spaces divided from the vacuum bin is not limited to 3 and can also be set to be 4 or more depending on the size of the vacuum bin or the amount of the cleaning solution that is temporarily stored.

In addition, the force of the cleaning solution discharged from the suction nozzle to the vacuum bin can also be weakened such that the cleaning solution is less likely to be taken from the vacuum bin into the vacuum tank. By decreasing the force of the cleaning solution discharged, even when the cleaning solution collides with the bottom of the vacuum bin, the amount of liquid moved up to the upper portion in the vacuum bin can be suppressed. Therefore, as illustrated in FIG. 9, a choke shape 91 is provided halfway the suction nozzle 90. When the cleaning solution discharged from the choke 91 collides with an inner wall of the lower suction nozzle 90 due to the choke 91, the energy is lost. When the cleaning solution comes into contact with the vacuum bin bottom, an effect of reducing the flow rate can be obtained.

FIG. 10A is a diagram illustrating another configurational example of the cleaning mechanism of each of the cleaning tanks A33 and B32. In this example, a vacuum bins for the cleaning tank A33 and a vacuum bins for the cleaning tank B32 are separately arranged.

Different points from the configurational example of the flow path illustrated in FIG. 3A will be mainly described. The suction nozzle A53 and a vacuum nozzle A54a are introduced into a vacuum bin A51a, and a solenoid valve SV7 for discharging the cleaning solution stored in the vacuum bin A51a is connected to the vacuum bin A51a. The vacuum nozzle A54a is connected to the vacuum tank 56 through a solenoid valve SV5. The vacuum suction opening 43a to 43c of the cleaning tank A33 are connected to the suction nozzle A53, and the vacuum suction of the cleaning tank A33 is controlled by the operation of the solenoid valve SV5. Likewise, the suction nozzle B52 and a vacuum nozzle B54b are introduced into a vacuum bin B51b, and a solenoid valve SV8 for discharging the cleaning solution stored in the vacuum bin B51b is connected to the vacuum bin B51b. The vacuum nozzle B54b is connected to the vacuum tank 56 through a solenoid valve SV6. The vacuum suction opening 42a to 42c of the cleaning tank B32 are connected to the suction nozzle B52, and the vacuum suction of the cleaning tank B32 is controlled by the operation of the solenoid valve SV6. The vacuum pump 55 is connected to the vacuum tank 56, and when the solenoid valve SV5 ad the solenoid valve SV6 are closed, the pressure in the vacuum tank 56 is maintained in a negative pressure state compared to atmospheric pressure.

Here, in the configuration of the flow path of FIG. 10A, the control of the solenoid valves SV5 to SV8 for operating the cleaning tank and the vacuum bin is illustrated in FIG. 10B. That is, in a case (No. 1) where the cleaning-solution suction operation of the cleaning tank A33 is performed, the solenoid valve SV7 is closed and the solenoid valve SV5 is opened such that the vacuum bin A51a enters a negative pressure state, and the cleaning solution from the cleaning tank A33 is sucked. At this time, the solenoid valve SV6 is closed such that a gap between the vacuum nozzle B54b and the vacuum tank is blocked. Likewise, in a case (No. 2) where the cleaning-solution suction operation of the cleaning tank B32 is performed, the solenoid valve SV8 is closed and the solenoid valve SV6 is opened such that the vacuum bin B51b enters a negative pressure state, and the cleaning solution from the cleaning tank B32 is sucked. At this time, the solenoid valve SV5 is closed such that a gap between the vacuum nozzle A54a and the vacuum tank 56 is blocked. In a case (No. 3) where the cleaning solution stored in the vacuum bin A51a is discharged, the solenoid valves SV6 and SV8 are closed and the solenoid valve SV5 is closed (atmospheric release) such that the vacuum bin A51a enters a normal pressure state, and the solenoid valve SV7 is opened. Likewise, in a case (No. 4) where the cleaning solution stored in the vacuum bin B51b is discharged, the solenoid valves SV5 and SV7 are closed and the solenoid valve SV6 is closed (atmospheric release) such that the vacuum bin B51b enters a normal pressure state, and the solenoid valve SV8 is opened.

FIG. 11 is a time chart illustrating the operation of the solenoid valve illustrated in FIG. 10B on the time axis. A period T3 during which the cleaning tank A33 is operated to suck the cleaning solution attached to the reagent probe 7a and a period T4 during which the cleaning tank B32 is operated to suck the cleaning solution attached to the reagent probe 8a are repeated. In each of the periods, a wait time t5 (wait time t6) for stabilizing the pressure in the vacuum bin is provided until the solenoid valve SV7 (solenoid valve SV8) is opened after closing the solenoid valve SV5 (solenoid valve SV6). When the vacuum bin A51a and the vacuum bin B51b have the same shape, the wait time t5 is the same as the wait time t6.

The configuration of the vacuum bin or the nozzle illustrated with reference to FIGS. 6 to 9 is applicable to each of the components constituting the flow path illustrated in FIG. 10A.

Hereinabove, the embodiment has been described using the reagent probe of the automatic analyzer as an example. The disclosed technique is applicable not only to the cleaning solution suction of the reagent probe but also to the cleaning solution suction of the sample probe. In addition, in the cleaning tank illustrated in FIGS. 2A to 2D, the example in which the cleaning to the cleaning solution removal are performed at one position has been described. However, the disclosed technique is applicable to a cleaning tank such that a cleaning portion for cleaning and a suction portion for removing cleaning water are separately provided. In addition, the disclosed technique is applicable not only to the technique of removing the cleaning solution of the reagent probe in which a notch is provided on the lid of the reagent bottle and the reagent is sucked from the reagent bottle but also to the technique of removing the cleaning solution of the reagent probe in which the lid of the reagent bottle is removed and the reagent is sucked from the reagent bottle. This way, the disclosed technique is widely applicable to structures of vacuum-sucking liquid, and the effects can be obtained when the disclosed effect is applied to a configuration of a flow path that sucks a large amount of liquid in a short time and is used as a temporary buffer.

REFERENCE SIGNS LIST

1: reaction disc
2: reaction container
3: cleaning mechanism
4: spectrophotometer
4a: light source
5, 6: agitation mechanism
7, 8: reagent dispensing mechanism
7a, 8a: reagent probe
9: reagent disc
10: reagent bottle
11: sample dispensing mechanism
11a: sample probe
13: cleaning tank
15: sample container
16: rack
17: sample conveyance mechanism
18: reagent syringe
19: sample syringe
20: cleaning pump
21: controller
30, 31: agitation-mechanism cleaning tank
32, 33: reagent-dispensing-mechanism cleaning tank
35: cleaning port
36: outlet
37: waste-liquid pipe
38: ball
40, 41: drain pipe
42a, 42b 42c, 43a, 43b, 43c: vacuum suction opening
51: vacuum bin
52, 53: suction nozzle
54: vacuum nozzle
55: vacuum pump
56: vacuum tank
60: vacuum bin main body
61: air inlet
62: divider
63: upper space
64: lower space
65: vacuum nozzle cover
71: air inlet
72: lower divider
73: intermediate space
74a, 74b, 74c: divider holder
80: extension portion
81: liquid droplet
90: suction nozzle
91: choke
SV1, SV2, SV3, SV4, SV5, SV6, SV7, SV8: solenoid valve

The invention claimed is:

1. An automatic analyzer equipped with a cleaning mechanism for performing cleaning to drying of a probe of a dispensing mechanism of the automatic analyzer; the automatic analyzer comprising:
a cleaning tank into which the probe is insertable and; the cleaning tank including a cleaning port provided with a suction opening;

a vacuum tank;
a vacuum pump configured to cause the vacuum tank to enter a negative pressure state, compared to atmospheric pressure;
a vacuum bin;
a suction nozzle that connects the suction opening of the cleaning port and the vacuum bin to each other;
a vacuum nozzle that connects the vacuum tank and the vacuum bin to each other; and
a controller configured to cause the vacuum tank which is in the negative pressure state and the cleaning port to be conducted via the vacuum bin in a period during which a cleaning solution, with which the probe is cleaned, is discharged through the cleaning port,
wherein the vacuum bin is provided with a first space and a second space which are formed in a longitudinal direction of a vacuum bin main body through a first divider having a first air inlet, and
wherein a tip of the vacuum nozzle is disposed in the first space of the vacuum bin, the suction nozzle penetrates through the first divider, and a tip of the suction nozzle is disposed in the second space thereof.

2. The automatic analyzer according to claim 1,
wherein an axis that passes through the center of the first air inlet of the first divider and extends in the longitudinal direction of the vacuum bin main body and a central axis of the vacuum nozzle are not coincident with each other.

3. The automatic analyzer according to claim 2,
wherein the first divider of the vacuum bin has a tapered shape that tapers from the first space toward the second space and the first air inlet is formed in the most tapered portion thereof.

4. The automatic analyzer according to claim 1, further comprising:
a first valve that regulates connection of the vacuum tank which is in the negative pressure state and the cleaning port; and
a second valve that regulates a discharge of a cleaning solution stored in the vacuum bin,
wherein the controller is configured to close the first valve and open the second valve after a predetermined time elapses.

5. The automatic analyzer according to claim 4, further comprising:
a third valve that regulates connection of the vacuum bin and the vacuum tank,
wherein the first valve is provided between the vacuum bin and the suction opening of the cleaning port, and
wherein the controller is configured to close the third valve and close the first valve after a predetermined time elapses.

6. The automatic analyzer according to claim 3,
wherein the vacuum bin is provided with a vacuum nozzle cover at the tip of the vacuum nozzle.

7. The automatic analyzer according to claim 3,
wherein the suction nozzle has a choke shape inside thereof.

8. The automatic analyzer according to claim 3,
wherein the vacuum bin is provided with a second divider that forms a third space in the second space thereof, and
wherein the second divider has a tapered shape that tapers in a direction opposite to the first divider, and a slit-shaped second air inlet is provided in a peripheral portion of the second divider.

9. The automatic analyzer according to claim 8,
wherein the third space of the vacuum bin is a space formed by the first divider and the second divider, and
wherein a relationship of an opening area of the second air inlet an opening area of the first air inlet an opening area of the vacuum nozzle is satisfied.

10. The automatic analyzer according to claim 1,
wherein at least a part of the vacuum bin main body is made of a transparent resin.

11. The automatic analyzer according to claim 1,
wherein the probe is a reagent probe.

12. The automatic analyzer according to claim 11,
wherein the controller is configured to cause the vacuum tank which is in the negative pressure state and the cleaning port to be conducted via the vacuum bin in a period during which an internal cleaning solution, with which an internal side of the reagent probe is cleaned, is discharged through the cleaning port.

* * * * *